(12) United States Patent  
Haydock

(10) Patent No.: US 7,730,508 B2  
(45) Date of Patent: Jun. 1, 2010

(54) DATA INJECTION

(75) Inventor: Steven Haydock, Bristol (GB)

(73) Assignee: STMicroelectronics Limited, Bristol (GB)

( * ) Notice: Subject to any disclaimer, the term of this patent is extended or adjusted under 35 U.S.C. 154(b) by 1221 days.

(21) Appl. No.: 10/380,924

(22) PCT Filed: Sep. 19, 2001

(86) PCT No.: PCT/GB01/04190

§ 371 (c)(1),
(2), (4) Date: Sep. 2, 2003

(87) PCT Pub. No.: WO02/25932

PCT Pub. Date: Mar. 28, 2002

(65) Prior Publication Data

US 2004/0030738 A1    Feb. 12, 2004

(30) Foreign Application Priority Data

Sep. 19, 2000    (GB) ................. 0022951.8

(51) Int. Cl.
H04N 7/10    (2006.01)

(52) U.S. Cl. .................. 725/32; 725/34; 725/36; 725/118; 725/127; 725/149

(58) Field of Classification Search .............. 725/118, 725/127, 149, 32, 34, 36

See application file for complete search history.

(56) References Cited

U.S. PATENT DOCUMENTS 5,365,272 A * 11/1994 Siracusa ................ 375/240.25
5,448,568 A * 9/1995 Delpuch et al. .......... 348/423.1
5,483,287 A * 1/1996 Siracusa ................. 375/240.26
5,566,174 A * 10/1996 Sato et al. .................... 370/468
5,648,960 A * 7/1997 Sakazaki et al. ............. 370/498
5,835,668 A * 11/1998 Yanagihara .................. 386/95
5,838,873 A   11/1998 Blatter et al. ................. 386/95
5,956,102 A * 9/1999 Lane ........................ 348/425.4
6,029,045 A * 2/2000 Picco et al. .................... 725/34
6,088,357 A * 7/2000 Anderson et al. ........... 370/392

(Continued)

FOREIGN PATENT DOCUMENTS

EP    0893913 A1    1/1999

OTHER PUBLICATIONS http://web.archive.org/web/19970523061054/http://www.mpeg.org/MPEG/DVD/Book_B/Standards.html—1997.*

(Continued)

Primary Examiner—Christopher Kelley  
Assistant Examiner—Sahar A Baig  
(74) Attorney, Agent, or Firm—Gardere Wynne Sewell LLP

(57) ABSTRACT

A data transport device for transporting a data stream, the device including: a data stream processing unit for receiving an input data stream including a plurality of data items, performing processing in dependence on the content of the items and forming an output data stream including at least some of the data items; and a data item injection unit including a memory for storing a plurality of injection data items and associated with each injection data item an injection action, and an injection processor arranged to retrieve the injection action for each of the injection data items in turn and in dependence on the retrieved injection action to inject the associated injection data item into the output data stream.

16 Claims, 4 Drawing Sheets

U.S. PATENT DOCUMENTS

| | | | |
|---|---|---|---|
| 6,091,772 A * | 7/2000 | Anderson et al. | 375/240.26 |
| 6,101,400 A * | 8/2000 | Ogaz et al. | 455/561 |
| 6,181,706 B1 * | 1/2001 | Anderson et al. | 370/412 |
| 6,438,145 B1 * | 8/2002 | Movshovich et al. | 370/536 |
| 6,463,060 B1 * | 10/2002 | Sato et al. | 370/389 |
| 6,574,793 B1 * | 6/2003 | Ngo et al. | 725/32 |
| 6,751,623 B1 * | 6/2004 | Basso et al. | 707/101 |
| 6,859,850 B1 * | 2/2005 | MacCormack | 710/52 |
| 7,079,176 B1 * | 7/2006 | Freeman et al. | 348/207.1 |
| 2002/0154694 A1 * | 10/2002 | Birch | 375/240.05 |

OTHER PUBLICATIONS

International Search Report, PCT/GB 01/04190 dated Dec. 28, 2001.
European Search Report, RS 105675 GB, dated Mar. 30, 2001.

* cited by examiner

DATA INJECTION

PRIORITY CLAIM

This application is a 371 filing from PCT/GB01/04190 filed Sep. 19, 2001, which claims priority from Great Britain Application No. 0022951.8 filed Sep. 19, 2000.

TECHNICAL FIELD

This invention relates to apparatus and methods for processing data streams.

BACKGROUND

There is an increasing number of applications in which data is transferred between a transmitter and a receiver as a plurality of data streams over a single logical link. The data streams can be segmented at the transmitter into packets, each of which contains some data from the data streams. Usually, but not necessarily, each packet contains data from only one of the data streams. The packets are then transmitted independently over the link. When the packets are received at the receiver they are reassembled so as to re-form the data streams. Advantages of this system over conventional analogue techniques are that there is no need for a dedicated link or channel to be assigned to each of the data streams; that interference in transmission may affect only some of the packets, leaving some data streams unaffected; and that packets may be routed to the receiver over any available physical link and still combined properly to re-form the data streams even if the packets arrive out of order.

Each packet normally includes control data that allows the packet to be reassembled properly by the receiver. This may comprise data indicating the data stream whose data is included in the packet, and a serial number for the packet so that the packet can be combined in the correct order with others from that data stream. The control data can also comprise error-check data such as a checksum for allowing the receiver to verify that the packet has not been corrupted during transmission.

One application for the above technology is in the delivery of digital video signals to households via cable or satellite links. Digital video streams may be packetized and then broadcast to household receivers. A user of a receiver may then select one of the streams for viewing. The receiver can then reassemble that video stream from the received packets, convert it to a form suitable for input to the user's television and then output the resulting signal to the television. It has been proposed that such systems could offer additional features. These features include the storing of received streams for later viewing, and the displaying of program guides (lists of programs with transmission times) which could be assembled by the receiver from certain transmitted packets.

FIG. 1 shows the transport packet stream syntax specified in ITU-T standard H.222.0, equivalent to ISO/IEC standard 13818-1. (Further detail of the structure is available from the standard itself, the contents of which are incorporated herein by reference). FIG. 1 is equivalent to annex F.0.1 of the H.222 standard. The transport stream 1 comprises a stream of packets, each of which consists of 188 bytes. Each packet has a variable length header illustrated at 2 and a payload which occupies the remainder of the packet. The header has the following structure:

| Number of bits | Signification |
|---|---|
| 8 | Synchronization byte |
| 1 | Transport error indicator |
| 1 | Payload unit start indicator |
| 1 | Transport priority |
| 13 | Program identification (PID) |
| 2 | Transport scrambling control |
| 2 | Adaptation field control |
| 4 | Continuity counter |
| Variable | Adaptation field |

The structure of the adaptation field is shown in more detail in FIG. 1.

Data representing video, audio, system information such as program guides and other user data streams can be carried as PES packets, which can be included in the payloads of the transport stream packets. The structure of a PES packet is shown in FIG. 2. FIG. 2 is equivalent to annex F.02 of the H.222 standard. Each PES packet comprises a 24 bit packet start code prefix, an 8 bit stream identification, 16 bits indicating the length of the PES packet, an optional variable length PES header and PES packet data of variable length.

FIG. 3 shows that the PES packets together form part of a program stream, whose structure is shown in FIG. 3. FIG. 3 is equivalent to annex F.0.7 of the H.222 standard.

In addition, section data can be carried in the packets. The section data can include information that is to be interpreted by the decoding unit. For example, section data may include:

1. data that is to be assembled by the receiving unit into a program guide indicating the programs that are to be provided on a channel;

2. data that is to be assembled into code that can be executed by an interpreter (an "o-code interpreter") in the receiving unit; and/or 3. data that is to be assembled into decoding keys to allow the receiving unit to decrypt encoded data transmissions such as pay-per-view video.

The overall structure of an H.222 packet containing section data is summarized in FIG. 4, which shows schematically some important features of the packet. The packet comprises a header 5, an adaptation field 6 and a payload 7. The header includes a payload unit start bit 8 and a program identifier (PID) 9. The payload includes one or more sections 10 and, if the payload unit start bit is set, a pointer field 11 which indicates the offset x to the start of the first new section (the intervening bits of the packet may represent tail data of a preceding section). Each section includes information giving the length of that block, and periodically a section includes CRC (cyclic redundancy check) data for it, in order for the receiver to check that section has been correctly received.

A receiving unit can check that a contiguous group of blocks of data forming a section has been received correctly, by calculating a CRC value for the section once it has been received and comparing the calculated CRC value with the received CRC data or, for example, a preset value. If there is the required match then it is assumed that the data has been received correctly. If there is not the required match then the whole section as received is discarded. Retransmission of the section may then be requested, or the receiver may assume that the incorrectly received section has been lost and continue by receiving the next section. In one such checking method a counter is maintained at the receiver, with an initial value of −1. Every incoming byte is combined in turn with the value in the counter to create a new value. The 4 bytes of CRC data at the end of a section are of the values such that if they and the rest of the section have been correctly received then after those 4 bytes have been combined in turn with the counter the value of the counter will be zero. A final value in the counter that does not match zero indicates that data has been corrupted.

During the processing of a data stream it is often required that data packets be injected into the stream, regularly or irregularly. For example, it may be required to insert program guide or teletext information into a digital video transport stream. Conventionally, the insertion of these packets is performed in-line with the standard processing of the data stream, and it therefore puts additional load on the apparatus that performs that standard processing since that apparatus must periodically interrupt its normal operations and determine which additional packets are to be inserted. Furthermore, relying on the standard processing apparatus to insert the packets does not take advantage of the fact that some data packets may have to be inserted repeatedly, at fixed or different intervals.

There is therefore a need for an improved means of inserting data packets into a data stream.

SUMMARY

According to one aspect there is provided a data transport device for transporting a data stream, the device comprising: a data stream processing unit for receiving an input data stream comprising a plurality of data items, performing processing in dependence on the content of the items and forming an output data stream comprising at least some of the data items; and a data item injection unit comprising a memory for storing a plurality of injection data items and associated with each injection data item an injection action, and an injection processor arranged to retrieve the injection action for each of the injection data items in turn and in dependence on the retrieved injection action to inject the associated injection data item into the output data stream.

According to a second aspect there is provided a method for transporting a data stream, comprising: receiving an input data stream comprising a plurality of data items; performing processing in dependence on the content of the items and forming an output data stream comprising at least some of the data items; storing a plurality of injection data items and associated with each injection data item an injection action; and retrieving the injection action for each of the injection data items in turn and in dependence on the retrieved injection action injecting the associated injection data item into the output data stream.

Suitably the injection processor is arranged to repeatedly perform the said operation of retrieving the injection action for each of the injection data items in turn and in dependence on the retrieved injection action injecting the associated injection data item into the output data stream.

Suitably the injection processor is responsive to an injection action indicating that an associated data item is to be injected only once to inject the data item into the output data stream and then change the injection action to indicate that the associated data item is not to be injected.

Suitably the injection processor is responsive to an injection action indicating that an associated data item is not to be injected to omit to inject the data item into the output data stream.

Suitably each data item in the output data stream includes a continuity count field and the injection processor is responsive to an injection action indicating that an associated data item is to be injected with continuity count modification to inject into the output data stream a version of the associated data item including a continuity count field indicative of a continuity count that is consistent with the location of the version of the associated data item in the output data stream.

The data items may be data packets.

The data item injection unit preferably stores a pointer indicative of the next injection data item to be processed and increments the pointer after processing an injection data item. The data item Injection unit is preferably arranged to wrap the pointer within the extent of the said memory. Thus it is preferred that the data item injection unit is arrange to continuously cycle through the injection data items, processing each one in accordance with its associated action.

The data item injection unit is preferably arranged to process successive injection data items at a specified time interval. That interval is adjustable by a user of the output data stream. The interval is preferably stored by the injection unit.

The data stream is suitably formed of packets. The data units may be comprised within the packets, for example as payload data or section data. The data streams may be in accordance with the ITU-T H.222 standard or a derivative thereof. The streams may be streams of packetized video data. At least some of the data items for injection may include program guide information or teletext information.

BRIEF DESCRIPTION OF THE DRAWINGS

The present invention will now be described by way of example with reference to the accompanying drawings, in which.

DETAILED DESCRIPTION OF THE DRAWINGS

Figure 1:
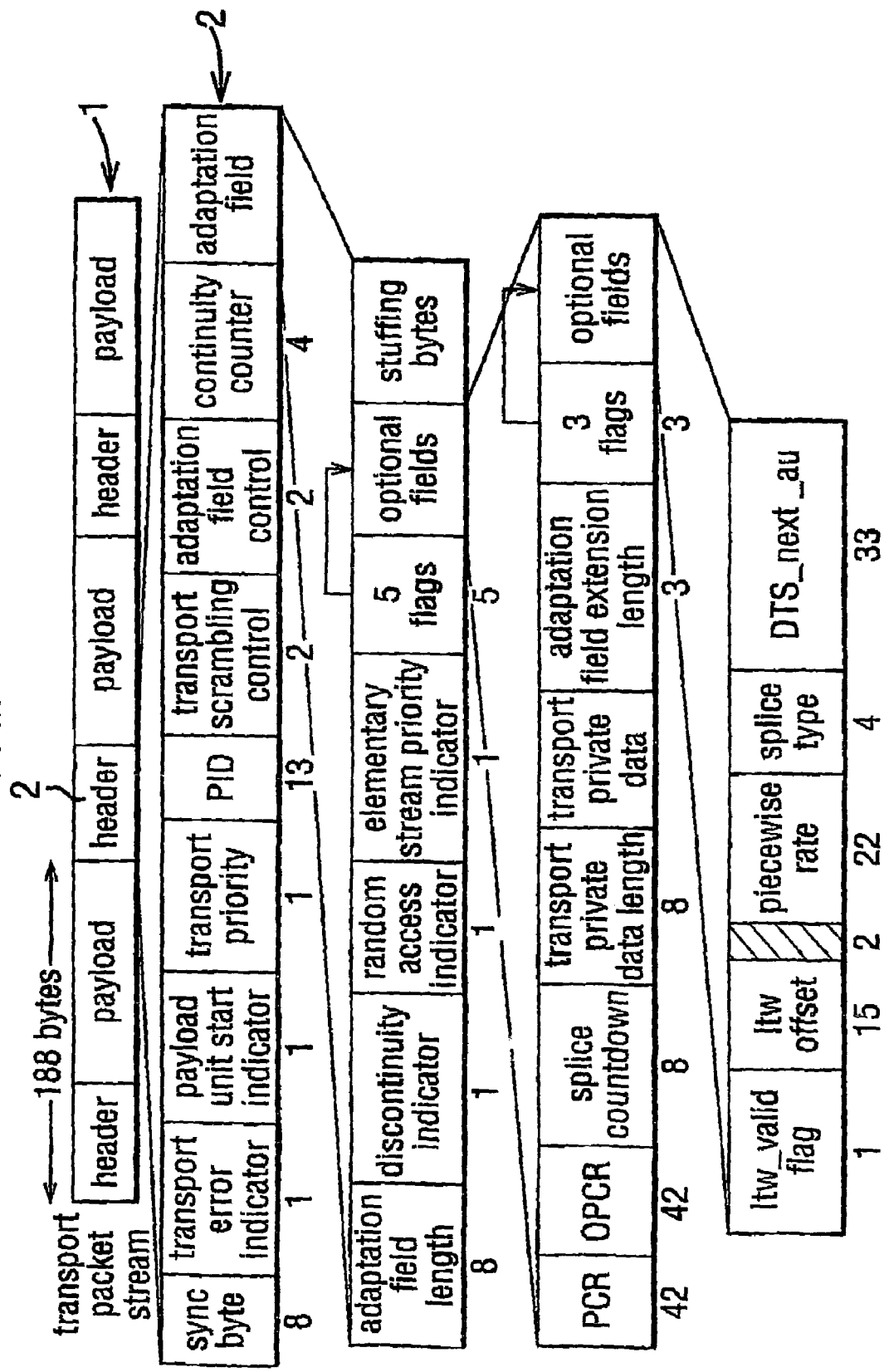
FIGS. 1 to 4 illustrate aspects of the H.222 standard for packet data transmissions.
Figure 2:
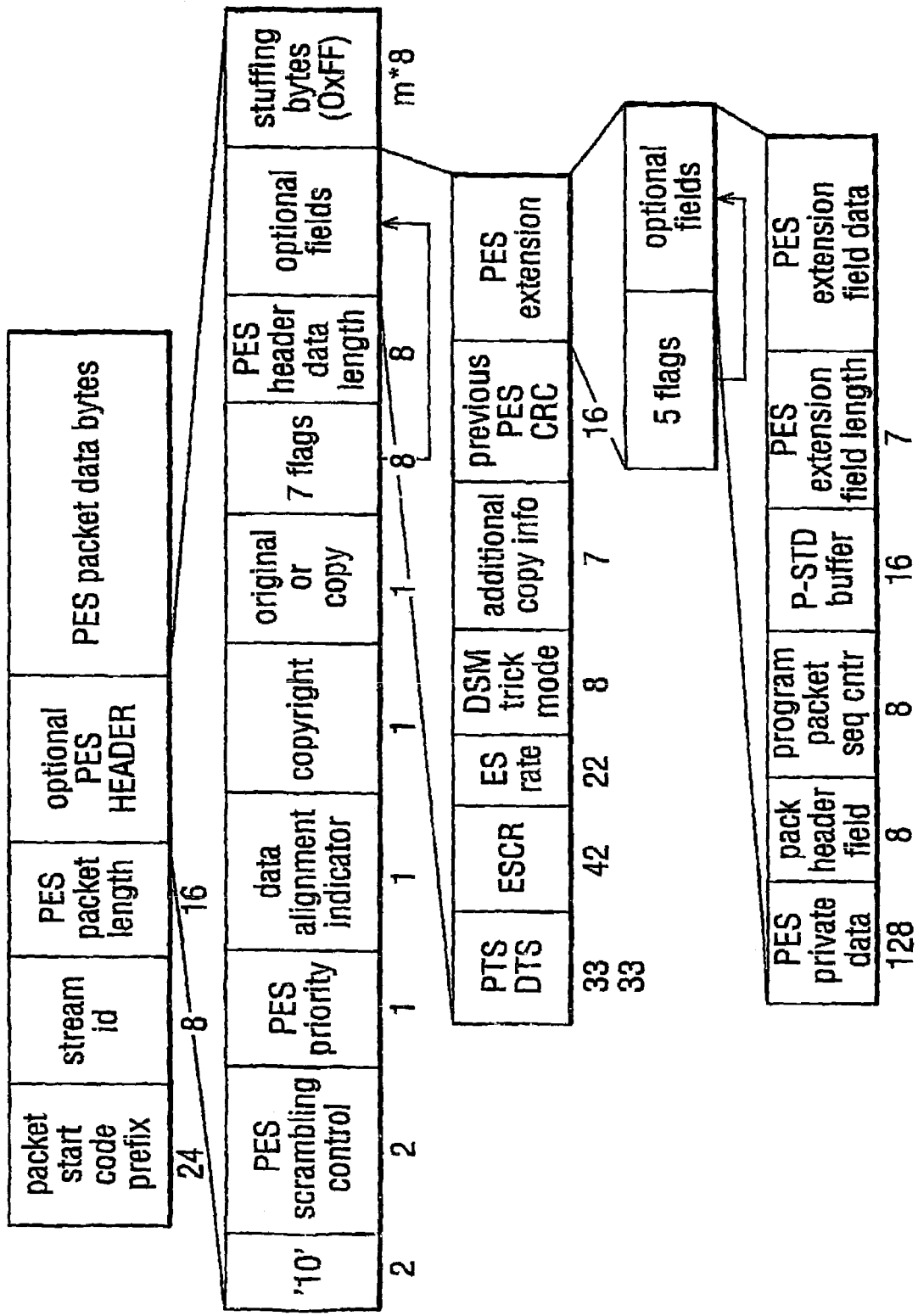
Figure 3:
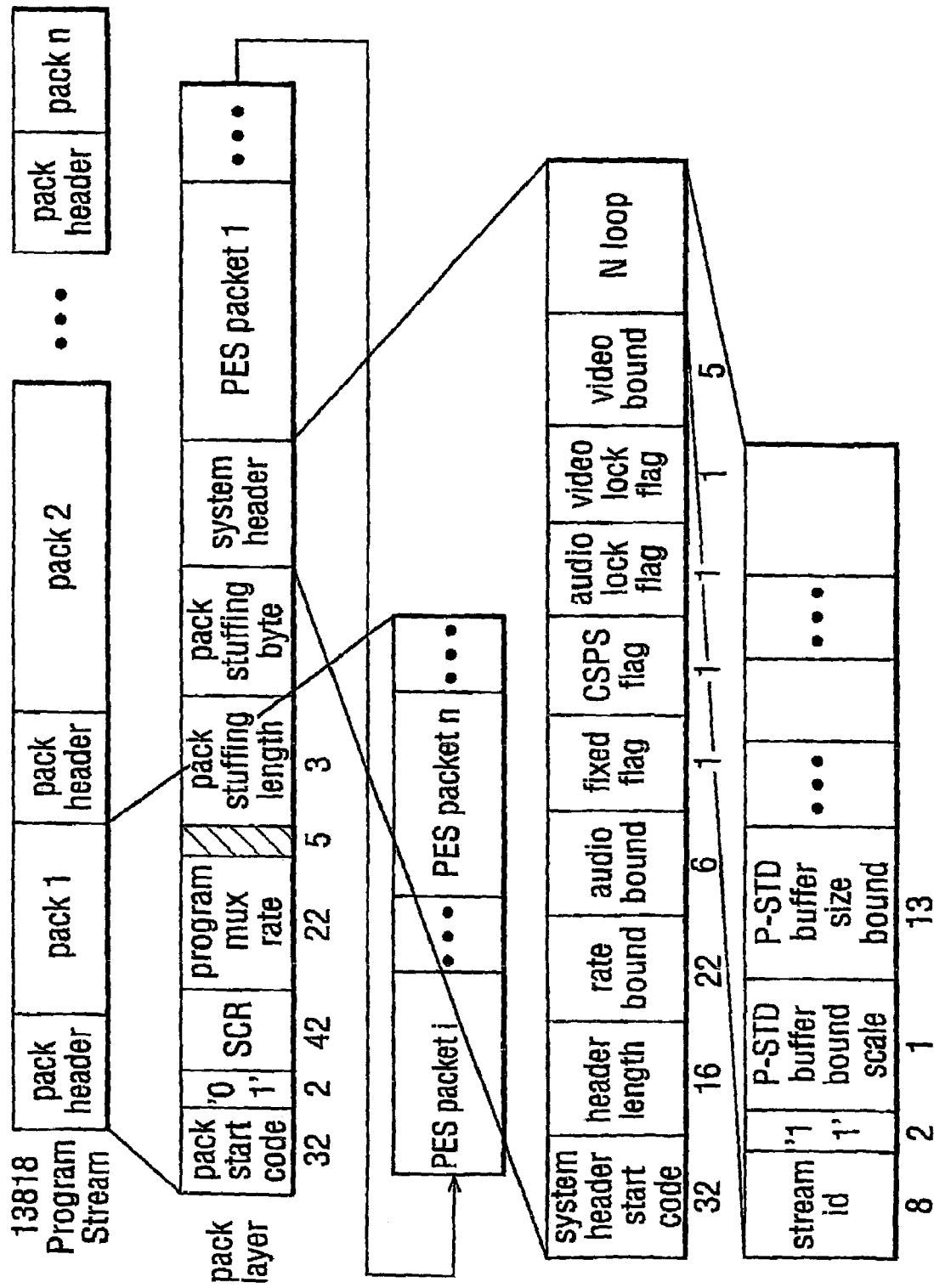
Figure 4:
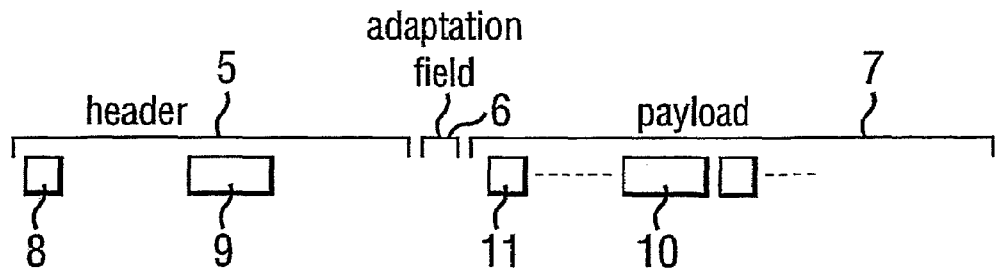
Figure 5:
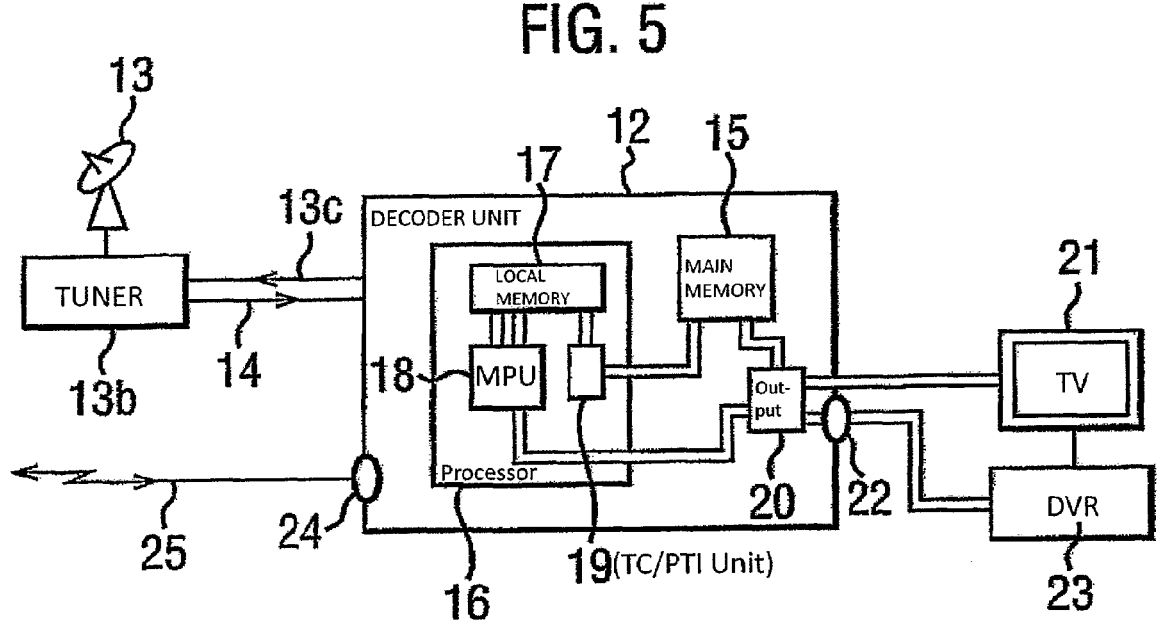
FIG. 5 shows the structure of a decoder unit and associated equipment.

FIG. 5 shows the general structure of a decoder unit 12 and ancillary equipment for handling an H.222 feed and outputting a video, audio, graphics or other feed to a suitable output unit such as a television or hi-fi. In this example the H.222 feed is received from satellite broadcast radio signals by satellite receiver dish 13. The satellite dish is connected to a tuner 13b which selects a single transponder channel of the satellite's transmissions under the control of a signal received over link 13c from the decoder unit 12. The transponder channel bears an H.222 packet data feed which may include data for a number of video and audio channels. The data from the transponder channel is sent over link 14 to the decoder.

The decoder includes a main memory 15 which may be implemented on one or more dedicated memory chips (integrated circuits) and a processing section 16 which may be implemented on one or more integrated circuits. The processing section includes a local memory 17, a processing unit 18 which runs software stored in memory 17 and a transmission control/peripheral transport interface (TC/PTI) unit 19 which is connected to memory 15 and memory 17 for transferring data rapidly between the two. The processing unit 18 is also connected to memory 15. The processing section has direct memory access (DMA) to memory 15.

The software code stored in the main memory is of three general types: user code, which includes code for interpreting program guides transmitted to the decode, for drawing graphics and for running "o-code"; PTI code together with drivers for output protocols such as audio, UART, tuner and video; and TC code. The user code can make calls on the PTI code. The user code and the PTI code together provide the software for decoding incoming data. The TC code provides the software for handling the error checking and demultiplexing of incoming data.

Program guides are built up from section data received by the decoder from time to time. The program guides are then stored by the decoder so that they can be displayed for a user when requested. Code for execution at the receiver or a subsequent processor can also be downloaded. o-code is one example of such downloadable code. o-code can be assembled from section data received from time to time. o-code represents software instruction code that can be run when required under the supervision of the o-code interpreter. O-code can be used, for example, for providing interactive advertisements, games or home shopping applications.

An output section 20 is provided in the decoder 12. The output section is connected to the memory 15 and the processing section 16. The output section is capable of performing relatively high level decoding and/or decompression for generating suitable output signals from the decoder. For example, the output section may be capable of decoding received MPEG or JPEG data. The output from the output section may pass to an output unit such as a television 21. The decoder includes an alternate output 22 for providing access to low level representations of the received data, for example cleaned and/or descrambled versions of the input stream to the decoder. This may be used by, for example, a digital video recorder 23.

The decoder also includes a control interface 24 for low speed bi-directional communication with a data service provider. In the example of FIG. 5 the control interface takes the form of a modem which is connected via a telephone line 25 to the service provider. The control interface provides a means for the decoder to request programs from the service provider.

In use the satellite may provide 32 transponder channels. One of these is selected by the receiving equipment (either fixedly or under user control). The selected transponder channel, which may be able to provide 8192 individual PID (program identification) streams, may carry 5 or 6 video channels and associated audio channels and support data such as program guide information. The user code defines a set of (e.g. 48) PIDs, and received packets bearing those PIDs are detected on the transponder channel and processed.

Under the H.222 standard each received packet may contain section data or PES data. Each packet may contain data from only a single PID. A packet containing PES data may contain data from only a single PES packet. A packet containing section data may contain data from one or more sections. See, for example, annex F.0.2-6 of the H.222 standard.

When the user code selects (either automatically or under the control of the user) that data from a PID is to be received it transmits the value of that PID to the processor 18. The processor stores the value of that PID in its local memory. The PID information in each incoming packet is compared with the stored PIDs. Packets not bearing one of the stored PID are discarded. If the specified PID is a section PID then the user code also specifies 8 bytes of selection data. When section data for that PID has been received bytes 0 and 3 to 9 of the section data (i.e. the start of the section header omitting bytes 1 and 2 which indicate the section data's length) are masked with the 8 bytes of selection data. If there is no match then the section data is discarded. This feature allows a user to filter out unwanted section data. When the end of a section is reached (as indicated by the received section data) the processor deletes the PID of that section from local memory to terminate reception of data from that PID.

One commercial use of the apparatus described above is as a hardware platform for implementation of set top box decoders (or other types of decoders) by applications programmers. In that situation the hardware as described above would perform the basic decoding functions, and the user code stored in the main memory could be developed by an applications programmer for a specific implementation. In designing the hardware for that use, it is highly preferable to substantially optimize the hardware for fast decoding of incoming data without the need for intervention by the user. One area where this is pertinent is in the decoding and building up of section data that is to be used by the user code to interpret, for example, program guides. As described above, a block of received data (whether PES or section data) is not known to be valid until all parts of it have been received, including any check data. In prior art systems it has been necessary for the user code to take account of this and to be aware that error checking of the received section data may make it necessary to discard data.

The present system may be implemented as a hardware peripheral for supporting demultiplexing of, and data extraction from a transport stream. The transport stream is a stream of data traveling between a data source and a user of the data. The present example will be described with reference to a transport stream that is a DVB standard transport stream in which data from up to 8192 PIDs is packed into 188 byte transport packets and multiplexed together. The hardware also supports the copying of a portion of this data and possible addition of alternate data back out of the device.

The software that resides on this peripheral may interact with a user of the data by means of memory space that is shared between the two.

The transport control (TC) hardware is suitably implemented as a 16 bit processor. The processor may be a processor component of a larger integrated data processing device. TC software (TC code) resides on the TC hardware for performing the transport and data extraction functions. The TC code uses data in shared SRAM to control its operation. There is data describing 48 slots each of which can collect data from 1 PID within the transport stream. Some slots send data directly to other devices, and some place data in circular buffers in the shared memory space. There are also data tables containing descrambling keys to allow descrambling of video or other data, section filter state tables, and other useful data.

The data is suitably carried in the form of PES packets. These may be units of data for, for example, video, audio or teletext. The PES packets can occupy many transport packets (consecutive in the PID but not in the transport stream), but are packed with stuffing bytes so that any transport packet contains data from only one PES packet. Sections are also defined in the data. Sections are blocks of data from 3 to 4096 bytes. Sections may span several transport packets. The transport packets may contain numerous of sections, starting at any offset from the head of the packet. Thus the tail end of a section from a previous packet (having the same PID) could conceivably take up most of a packet.

Each circular buffer has a descriptor in the shared SRAM. In the prior art, one route to describing the state of such a buffer is by means of two pointers: a read pointer and a write pointer. The consumer of data from the buffer updates the read pointer after taking data out of a buffer, and the write is updated after placing data in a buffer. A problem with this approach is that since data can be multiplexed and can span several transport packets, a buffer may have data added to it over a long period of time before an entire section or PES packet has been collected. if an error is discovered within the transport stream the PES packet or section may be in error. In the present system the state of each buffer is described by three 3 pointers: a read pointer, a write pointer and a quantized write pointer. The standard 2 pointer model has read and write, the consumer updates read after taking data out of a buffer, and the write is updated after placing data in a buffer.

In the present system, three pointers are used: a read pointer, a write pointer and a quantized write pointer. The quantized write pointer is only updated when a valid complete section or PES packet has been collected. If an error is detected the temporary write pointer is overwritten with the quantized pointer, thus effecting a windback of the buffer, and removing the possibility of the buffer containing a partial section or PES packet.

In a preferred implementation of the present system the supports a number (e.g. 64) of interrupt bits which are separately maskable, settable and acknowledgeable. The TC hardware is then able to codeset the interrupt bit for each slot when a completed PES packet or section has been collected for that slot. When data arrives frequently it is possible for a large number of interrupts to be generate, degrading system performance. Also given one interrupt the software may need to handle one or many input PESs packets or sections.

The present system is arranged so that the interrupt handler disables further interrupts on a slot when it receives the first interrupt, to signal to the inputting process and to have the input process function in a simple loop of the form:

```
while true
    wait on data present semaphore
    handle one section or PES packet
    call function to update read pointer to after the handled
        section/PES packet
```

The function that updates the read pointer also checks to see if any data remains, or has arrived, in the circular buffer, if data is present it re-signals the data present semaphore, if not then it re-enables the interrupt. This simplifies the input process to a simple loop, and reduces interrupt traffic by leaving the interrupt disabled until the inputting process has consumed all data in the input buffer, including any that arrived during processing of the data that was present when it was first signaled.

By means of this approach the main loop set out above for processing data can continue to run unaltered when the buffer overflows. The stepwise operation of the loop is under the control of the data present semaphore. By returning the data present semaphore to its set or true state after a section has been handled or processed, the loop can be caused to continue unpaused until all data has been read. Then the interrupt can be reset or disabled.

It is generally very difficult to debug the software on a peripheral such as the present unit since when running normally there is no way to monitor the instruction pointer or registers at anything approaching real time, and there is no breakpoint mechanism available. Also, debugging an interrupt handler is especially difficult since in a working system it is undesirable to interfere with the execution of the handler.

In the present system a macro called debug_event is called at various points in the code. This macro takes as a parameter a constant value or register to be written into a buffer in the shared SRAM, for the TC code, or in an unused region of the main memory for code running on the main processor unit that is to receive data from the TC unit. Two other macros are called during initialization of the code: print_debug_events and initialize debug_events; (which are called in that order) to print debug information from the previous run and initialize the buffers for the current run.

This method of displaying debug at the start of the next run allows for a method of debugging code that it is not wished to greatly perturb, and which may completely crash the processor, which cannot be examined in other ways.

The TC is suitably embodied as a 16 bit processor without a carry flag. Incoming data can be stored via a DMA engine into a circular buffer, which wraps around. When a section or PES packet is completed, the returned address for the end of that section or packet is not wrapped. It is possible, for example, that if the system is three bytes from the end of the buffer and a 6 byte section arrived for processing 3 bytes will be stored at the end and 3 at the beginning, but the address of the end of the section could be given as 3 bytes beyond the end of the buffer. To address this, this case is recognized and the address fixed up to three bytes from the beginning of the buffer. If the address is a 32 bit address and the TC is a 16 bit device without a carry flag (but with zero and sign flags) a special algorithm can be provided to do the fixup. The algorithm is given below, where ptr is the returned address, top is the end of the buffer, and base is the base of the buffer. High and low refer to the 16 bit portions of the 32 bit values:—

```
; Note VH = ptr high    VL = ptr low
;      TH = top high     TL = top low
;      OH = offset high  OL = offset low
;      BH = base high    BL = base low
;
; Pointer wraparound algorithm is :-
;
;   1/ Find offset = (Pointer – TOP) if
;      its –ve then no wraparound
;          Calculate OH = (VH – TH) if –ve exit
;          if( VL and TL same sign)
;              Calculate OL = (VL – TL)
;              if result +ve then we have wraparound
;              else carry, OH--, if –ve exit
;
;          else( VL and IL different sign)
;              Calculate OL = (VL – TL)
;                  if( TL –ve) carry, OH--, if –ve exit
;                  else we have wraparound
;   2/ Now have OH and OL, calculate
;      wrapped pointer = (Base + Offset)
;
;          VH = BH + OH
;          if( BL and OL not same sign)
;              calculate VL = BL + OL
;                  if( VL +ve carry ) VH++
;          else
;              calculate VL = BL + OL
;                  if( both were –ve then carry ) VH++
```

Section filtering is suitably supported, whereby it may be decided which sections to place in the user's circular buffer, for example when, due to high rates, it is necessary to discard many sections. In some circumstances it is desired that some section filters be enabled when other filters have matched. This is described as an action on the matching filter. There are 32 filters, and any of them may have actions—though there should never be more than 8 with actions associated at any one time.

In the filtering software it must be checked whether a match is present between 32 bits of data, a 32 bit mask which indicates which filters are currently enabled and a 32 bit mask indicating any filtering to be applied. These could be checked using a simple 32 pass loop, to check each bit position one-by-one. However, due to time constraints it would be greatly preferably to avoid this. Therefore, in the present system the following are stored:

1) a list of masks each with one bit set for each filter with associated actions 2) a matching list containing 32 bit masks of those filters to be enabled on a match 3) conglomerate masks indicating which filters have actions associated with them.

The procedure then is to use the conglomerate masks to check if any action task needs to be done, if it does then the list is scanned ANDing the entry from list 1. If a non zero result is achieved then the corresponding entry from list 2 is ORed in to the mask of which filters are currently enabled. When the result of the ORing operation is zero all necessary masks have been applied.

When a user wishes to send out packets on the ("alternate") output stream a mechanism is needed that, within the software driver on the user hardware, can control the insertion of the packets. In the present system a circular list is used to address this problem. A circular list of "carousel" entries is provided. Each entry contains a packet and some control information. The carousel management process cycles round the list transmitting those entries that are set to be transmitted. An entry may be in one of several states, disabled, one-_shot_inject (signifying that it is to be disabled after transmission), repeated_inject_as_is (indicating that it should be repeatedly injected as-is), repeated_inject_with_cc_fixup (indicating that it should be repeatedly injected with that packed being adjusted to correct continuity counts). Interval controls are provided to allow the retransmission rate etc. to be specified.

This approach allows several potential problems that could confront the user to be addressed. In a real transport stream it is normal for section information to be transmitted every ½ second or so. Using the carousel as described above removes the overhead for this from the user and allows the driver to manage stream integrity.

In the system of FIG. 5 the decoder is configured so that the error checking of section data is transparent to user code. The process for achieving this is illustrated in FIG. 6.

Figure 6:
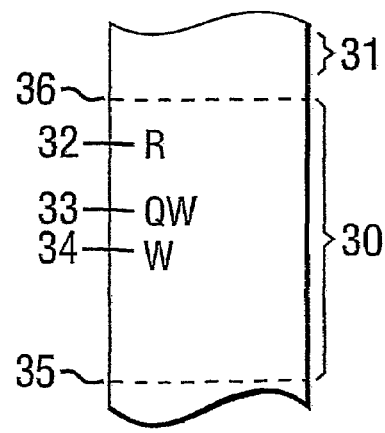
FIG. 6 illustrates the structure of a buffer and associated pointers.

FIG. 6 illustrates a region of memory in the main memory 15. One part 30 of the memory stores received section data. Another part 31 of the memory stores pointers QW and R which point to a memory addresses in part 30. Memory in the processing unit 16 stores another pointer W which also points to a memory address in part 30. For illustration the current addresses indicated by R, QW and W are shown at 32, 33 and 34 respectively in FIG. 6. Pointer R represents a read pointer. Pointer QW represents a quantized write pointer. Pointer W represents a write pointer. The contents of the memory 31, representing pointers 32 and 33, are available to user code. The pointer W is preferably not directly available to user code. The extent of part 30 of the memory is known to the processor 16 and to the user code, and part 30 of the memory is considered to wrap around from upper boundary 35 to lower boundary 36.

The operation of the decoder for decoding section data and making it available to user code will now be described.

In the user code pointer R is interpreted as a read pointer, indicating the next address in the memory 15 from which the user code is to read and process the section data. As section data is read by the user code the user code updates the pointer R accordingly. The pointer QW is interpreted by the user code as a limit pointer beyond which the pointer R may not pass. If the pointer R meets the pointer QW then the user code must consider that no unread section data is currently available.

In the processor 16, initially pointers W and QW are set to the first address in buffer 30 of memory 15. Incoming section data is extracted from received packets. Each incoming part of section data is stored at the write pointer. Then the write pointer is incremented by the length of that part so that it is points to a location immediately after the last written part. This process continues as section data is normally received, until check digit information for a received complete section (stored between the QW and W pointers) is received. At that stage a CRC for the received data—which could be calculated at that time or could more preferably be built up as each incoming section is received—is checked, for example, by comparison with a received CRC or a predetermined value such as zero. If the CRC for the received data is corrects match then pointer QW is set to the value of pointer W and the process continues; this adjustment of the pointer QW makes the newly checked section data available to the user code. If the CRCs do not match then the value of pointer W is set to the value of pointer OW; this means that the possible erroneous data is not made available to the user code, and will be overwritten by subsequently received section data.

The ongoing CRC testing may be performed by loading a value of −1 into a memory before reception of a section begins, combining that value with each received byte of the section in turn including one or more CRC bytes of the section, and comparing the resulting value with zero. If the resulting value is zero then the section may be deemed to have been correctly received, and otherwise incorrectly received.

During reception of section data two other errors in addition to the "CRC fail" error are acted upon by the processor 16. Each packet containing section data has a serial number. If a section is detected as having been received out of order then a "CC (continuity count) fail" error is indicated and the value of pointer W is set to the value of pointer QW. If (following a wrap-around of pointer W) the pointer W meets pointer R then the buffer 30 is interpreted as having overflowed. To avoid correctly received but unread data (located after the pointer R) being overwritten the value of pointer W is set to the value of pointer QW.

Thus, on completion of any group of received sections the pointer QW is set to the position of pointer W, and on detection of any error the pointer W is set to the position of pointer OW.

In the system of FIG. 6 the interface available to the user code is designed so that the user code has no access to the pointer W. The user code is unaware of the position of pointer W. The user code can, however, safely read data up to pointer QW. Therefore the error checking of section data that is performed by the processor 16 is transparent to the user code.

One buffer as shown in FIG. 6 with respective associated pointers W, QW and R may be maintained for each PID from which section data is to be received. When the PID is selected by the user code for reception the user code allocates in memory 15 the buffer indicated in FIG. 6 at 30 and 31 and informs the processor 16 of the address and length of the buffer. When the user shuts down a channel the processor 16 flushes the buffer for that channel and sets the associated OW pointers to the value of the associated W pointer.

The applicant draws attention to the fact that the present invention may include any feature or combination of features disclosed herein either implicitly or explicitly or any generalization thereof, without limitation to the scope of any of the present claims. In view of the foregoing description it will be evident to a person skilled in the art that various modifications may be made within the scope of the invention.

The invention claimed is:

1. A data transport device for transporting a data stream, the device comprising:
   a data stream processing unit for receiving an input data stream comprising a plurality of data packets, each data packet including a continuity count field storing a serial number indicative of packet order in the data stream, performing processing in dependence on the content of the data packets and forming an output data stream comprising at least some of the data packets; and
   a data packet injection unit comprising:
      a memory configured to store a plurality of entries, wherein each stored entry comprises:
         an injection data packet; and
         an injection action associated with the injection data packet, and
      an injection processor arranged to retrieve the injection action and associated injection data packet from the entry in memory and, in turn and in dependence on the retrieved injection action, to inject the associated injection data packet into the output data stream of data packets, the injection data packet having a continuity count field and the injection processor including in the continuity count field a serial number consistent with serial numbers in the continuity count fields of the data packets within the output data stream at an injected location of the injection data packet.

2. A data transport device as claimed in claim 1, wherein, if the retrieved injection action specifies repeatedly inject, the injection processor functions to repeatedly perform the operation of retrieving the injection action for each of the injection data packets in turn and in dependence on the retrieved injection action to inject the associated injection data packet into the output data stream.

3. A data transport device as claimed in claim 1, wherein, if the retrieved injection action specifies inject once only, the injection processor functions to inject the associated injection data packet into the output data stream only one time and then change the stored injection action to indicate that the associated injection data packet is not to be further injected.

4. A data transport device as claimed in claim 1, wherein, if the retrieved injection action specifies do not inject, the injection processor functions to omit to inject the injection data packet into the output data stream.

5. A data transport device as claimed in claim 1, wherein the data packet injection unit stores a pointer indicative of the next injection data packet to be processed and increments the pointer after processing an injection data packet.

6. A data transport device as claimed in claim 5, wherein the data packet injection unit is arranged to wrap the pointer within the extent of the memory.

7. A data transport device as claimed in claim 1, wherein the data packet injection unit is arranged to process successive injection data packets at a specified time interval.

8. A data transport device as claimed in claim 7, wherein the interval is adjustable by a user of the output data stream.

9. A method for transporting a data stream, comprising:
   receiving an input data stream comprising a plurality of data packets, each data packet including a continuity count field storing a serial number indicative of packet order in the data stream;
   performing processing by a device in dependence on the content of the data packets and forming an output data stream comprising at least some of the data packets;
   storing a plurality of entries, wherein each entry comprises:
      an injection data packet; and
      an injection action associated with each injection data packet; and
   retrieving an entry comprising the injection action and associated injection data packet; and
   in turn and in dependence on the retrieved injection action, injecting the associated injection data packet into the output data stream of data packets, the injection data packet having a continuity count field and injecting further comprising including in the continuity count field a serial number consistent with serial numbers in the continuity count fields of the data packets within the output data stream at an injected location of the injection data packet.

10. A method as claimed in claim 9, further comprising repeatedly retrieving the injection action for each of the injection data packets in turn and in dependence on the retrieved injection action and injecting the associated injection data packet into the output data stream.

11. A method as claimed in claim 9, wherein responsive to retrieving an injection action indicating that an associated data packet is to be injected only once, the method comprises:
   injecting the injection data packet into the output data stream; and
   changing the stored injection action to indicate that the associated injection data packet is not to be further injected.

12. A method as claimed in claim 9, wherein responsive to retrieving an injection action indicating that an associated data packet is not to be injected, the method comprises:
   omitting to inject the injection data packet into the output data stream.

13. A method as claimed in claim 9, further comprising:
   storing a pointer indicative of the next injection data packet to be processed; and
   incrementing the pointer after retrieving an injection data packet.

14. A method as claimed in claim 13, further comprising wrapping the pointer within the extent of the memory.

15. A method as claimed in claim 9, further comprising processing successive injection data packets at a specified time interval.

16. A method as claimed in claim 11, wherein the specified time interval is adjustable by a user of the output data stream.

* * * * *